(12) United States Patent
Zhu

(10) Patent No.: US 6,453,542 B1
(45) Date of Patent: Sep. 24, 2002

(54) METHOD FOR FABRICATING BALANCED SHIELD CONNECTIONS FOR NOISE REDUCTION IN MR/GMR READ HEADS

(75) Inventor: Li-Yan Zhu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/514,901

(22) Filed: Feb. 28, 2000

(51) Int. Cl.$^7$ .......................... G11B 5/127; H04R 31/00
(52) U.S. Cl. .................. 29/603.07; 29/603.13; 29/603.15; 29/603.18; 29/852; 360/103; 360/104; 360/113; 360/122; 360/322
(58) Field of Search .................. 29/603.07, 603.13, 29/603.15, 603.18, 852; 360/103, 104, 113, 122, 322

(56) References Cited

U.S. PATENT DOCUMENTS

| | | | | |
|---|---|---|---|---|
| 3,908,194 A | * | 9/1975 | Romankiw | 360/113 |
| 4,308,592 A | * | 12/1981 | McGouey | 365/8 |
| 4,568,906 A | * | 2/1986 | De Wilde | 338/32 R |
| 4,802,043 A | * | 1/1989 | Sato | 360/113 |
| 4,841,480 A | * | 6/1989 | Lampe | 365/87 |
| 5,331,728 A | * | 7/1994 | Argyle | 29/603 |
| 5,496,759 A | * | 3/1996 | Yue | 437/52 |
| 5,539,598 A | | 7/1996 | Denison et al. | 360/113 |
| 5,739,990 A | * | 4/1998 | Ravipati | 360/113 |
| 5,761,009 A | | 6/1998 | Hughbanks et al. | 360/113 |
| 5,831,426 A | * | 11/1998 | Black | 324/127 |
| 6,007,731 A | * | 12/1999 | Han | 216/22 |
| 6,024,886 A | * | 2/2000 | Han | 216/38 |
| 6,032,353 A | * | 3/2000 | Hiner | 29/603.14 |
| 6,043,959 A | * | 3/2000 | Cure | 360/113 |
| 6,153,443 A | * | 11/2000 | Durlam | 438/3 |
| 6,165,803 A | * | 12/2000 | Chen | 438/3 |
| 6,284,107 B1 | * | 9/2001 | Zhu | 204/192.2 |

* cited by examiner

Primary Examiner—Carl J. Arbes
Assistant Examiner—Paul D Kim
(74) Attorney, Agent, or Firm—George O. Saile; Stephen B. Ackerman

(57) ABSTRACT

A method for fabricating balanced shield connections for noise reduction MR/GMR read heads and an MR/MGR read head so fabricated. The present invention teaches a method for forming a balanced electrical half-bridge in parallel with the MR/GMR element of a read head so as to reduce readback noise caused by discharges between the two ends of the MR/GMR sensor element, which are at different potentials as a result of the bias current passing through the sensor, and the magnetic shields, whose potential is constant. The half-bridge is connected to each of the magnetic shields by interconnects attached to a pad at its mid-point, thus placing the shields at the same average potential as the sensor element.

13 Claims, 2 Drawing Sheets

METHOD FOR FABRICATING BALANCED SHIELD CONNECTIONS FOR NOISE REDUCTION IN MR/GMR READ HEADS

BACKGROUND OF THE INVENTION

1. Field of the Invention

This invention relates to the protection of MR/GMR magnetic read heads from electrostatic discharge and dielectric breakdown. It also relates to the reduction of noise in the readback signal during operation of MR/GMR magnetic read heads.

2. Description of the Related Art

Magnetic read heads utilizing magnetoresistive or giant magnetoresistive (MR/GMR) sensor elements are used in the retrieval of magnetically stored data from moving magnetic media such as tapes and disks. Such read heads are formed integrally with a "slider," which literally flies over the surface of the moving medium on a layer of air. The sensing portion of the read head consists of the MR/GMR sensor element, sandwiched between two magnetic shields that are insulated from the sensor by thin dielectric layers and whose purpose is to isolate the sensor from the magnetic fields of nearby encoded tracks that are not being accessed. A constant biasing current must be passed through the sensor element during its operation in order to convert its resistance variations to a readable signal.

During their operation, such read heads are subject to various forms of readback noise. Not only does such noise degrade the quality of the signal produced by the head, but the various causes of the noise can also damage the head itself. One source of readback noise is the buildup of electrical charge on various parts of the head as a result of friction and the relative motion between the head and the magnetic medium. When sufficient charge accumulates, the electrostatic potential difference between parts of the head, notably the sensor element and magnetic shields, can exceed the dielectric breakdown strength of the insulating materials between these parts, causing a sudden electrical discharge. This discharge produces noise, sometimes called "spike noise," in the signal and can damage the parts of the head which receive it. The invention of Sato et al. (U. S. Pat. No. 4,802,043) teaches a method of forming a magneto-resistive read head with partially surrounding conducting layers that remove the static electric charge buildup before damaging discharges can occur. The method of this invention requires a permanent connection, with negligible resistance, from the ground lead of the magnetoresistive sensor to both shields. Denison et al. (U.S. Pat. No. 5,539,598) teach a method for forming a magneto-resistive read head whose magnetic shield is permanently coupled to ground through a resistor of several kilo-ohms. Finally, Hughbanks et al. (U.S. Pat. No. 5,761,009) teach a method for forming a parasitic shield in close proximity to the actual magnetic shield of the read head. By maintaining the parasitic shield at the same potential as the sensor element of the read head, yet having it in closer proximity to the actual magnetic shield, electric discharges will preferentially be from shield to shield, rather than shield to sensor.

There is yet another cause of electrical discharge between the magnetoresistive sensor and its surroundings that is unrelated to the frictional buildup of static electric charges. As was discussed above, in the normal operation of a magnetoresistive read head a longitudinal bias current passes through the sensor element, entering and leaving through conductive leads that are affixed to it. This current produces an Ohm's law potential variation along the length of the sensor. Since the magnetic shields do not carry such a current, they are equipotential surfaces. Therefore, with the possible exception of a single small region, there will exist a significant potential difference between shield and sensor. FIG. 1 graphically illustrates the potential variation along a sensor with nominal 50 ohm resistance and a bias current of 5.0 milliamps, as compared with the constant potential of its magnetic shield. As can be seen, the greatest potential difference between shield and sensor occurs where the shield is in closest proximity to the sensor/lead junction, where the bias current enters and leaves the sensor. It is at these points that electrical discharges can occur between the shield and the sensor, leading to noise and possibly to damage. It has been noted that this type of electrical discharge occurs in an irregularly oscillating or "see-saw" pattern. When the discharge occurs at one end of the shield, the transfer of charge causes the shield potential to suddenly change. This makes the other end of the shield the point of maximum potential difference between it and the sensor. The next discharge is, therefore, most likely to be at that end. Thus, the pattern of end to end discharges continues. The severity of this type of discharge is exacerbated by metal "smearing" on the air-bearing surface (ABS) of the read head. If the metal smear on a noisy head is removed by focused ion-beam (FIB) etching, the noise is reduced. None of the previously cited inventions addresses this form of electrical discharge.

SUMMARY OF THE INVENTION

It is an object of the present invention to significantly reduce the frequency and severity of readback noise caused by electrical discharges due to bias-current longitudinal potential differences between a MR/GMR sensor and its magnetic shields.

It is another object of the present invention to significantly reduce the possibility of damage to a MR/GMR sensor caused by electrical discharges due to bias-current longitudinal potential differences between said sensor and its magnetic shields.

It is yet another object of the present invention to provide a method for fabricating an MR/GMR magnetic read head, during whose operation there is a reduction in the frequency and severity of readback noise and in the possibility of damage, both caused by electrical discharges due to bias-current longitudinal potential differences between its MR/GMR sensor and its magnetic shields.

It is yet another object of the present invention to provide an MR/GMR magnetic read head, during whose operation there is a reduction in the frequency and severity of readback noise and in the possibility of damage, both caused by electrical discharges due to bias-current longitudinal potential differences between its MR/GMR sensor and its magnetic shields.

It is yet another object of the present invention to provide a mechanism for reducing both the frequency and severity of readback noise in a MR/GMR sensor and the possibility of its damage, caused by electrical discharges due to bias-current longitudinal potential differences between its MR/GMR sensor and its magnetic shields, wherein such mechanism also permits diagnosis of inadvertent sensor-to-shield short circuits and helps in the failure analysis of open circuits during the fabrication process.

It is yet another object of the present invention, by providing a mechanism for reducing both the frequency and severity of readback noise in a MR/GMR sensor and the possibility of its damage due to bias-current longitudinal potential differences between its MR/GMR sensor and its magnetic shields, to create a slider assembly that is less sensitive to "metal smear" at the air-bearing surface (ABS) and, thereby, to increase the slider fabrication yield.

The objects of this invention are achieved by a read head structure and method of fabrication that allows the magnetic shields of the read head to be held at the same potential as the center of the MR/GMR sensor element. Because of the extremely small size of the sensor element, it is impractical to electrically connect it directly to the shields. Accordingly, the present invention teaches a method of fabricating a balanced electrical half-bridge of large surface area and substantially greater resistance than the MR/GMR sensor element that is connected in parallel with said sensor. The mid-point of the half-bridge is of sufficient size to permit connection to the shields and it has a pad for forming interconnects with said shields. Said half-bridge has a resistance which is approximately 100× the sensor resistance and, therefore, dissipates that much less power than the sensor. Its greater surface area allows it dissipate more heat in steady state operation and to store more heat during a transient. Therefore, the half-bridge is in no danger of melt-down during either steady state or transient operation.

The half-bridge also assists in failure mode analysis of the MR/GMR sensor. If said MR/GMR sensor is destroyed by electrostatic discharge (ESD) or overlapped so as to destroy the MR/GMR structure during slider fabrication, the known intermediate value of the measured resistance with half-bridge in place will be on the order of 5,000 ohms. If, on the other hand, the open is due to a broken wire or bad bonding, the measured resistance will be infinite. Thus, the electrical half-bridge provides a mechanism for discriminating between two failure modes that, in the present art, are indistinguishable by resistance measurements. Finally, the present invention achieves the above objects in a manner that allows the connection between the MR/GMR sensor and the shields to remain permanently in a finished slider, because any noise from the shields is rejected by a differential preamplifier. It is to be noted that the methods taught in U.S. Pat. Nos. 4,802,043 and 5,539,598, will not work with differential preamplifiers because there is no ground lead. The parasitic shields formed in accordance with the invention of Hughbanks (U. S. Pat. No. 5,761,009) are positioned further from the high potential ends of the sensor element than the actual shields and would not offer protection from the type of discharges that are the focus of the present invention.

DESCRIPTION OF THE PREFERRED EMBODIMENTS

The present invention is an MR/GMR magnetic read head with balanced shield connections for reduction in the frequency and severity of readback noise and possibility of damage caused by electrical discharges due to bias-current longitudinal potential differences between its MR/GMR sensor and its magnetic shields.

Figure 1:
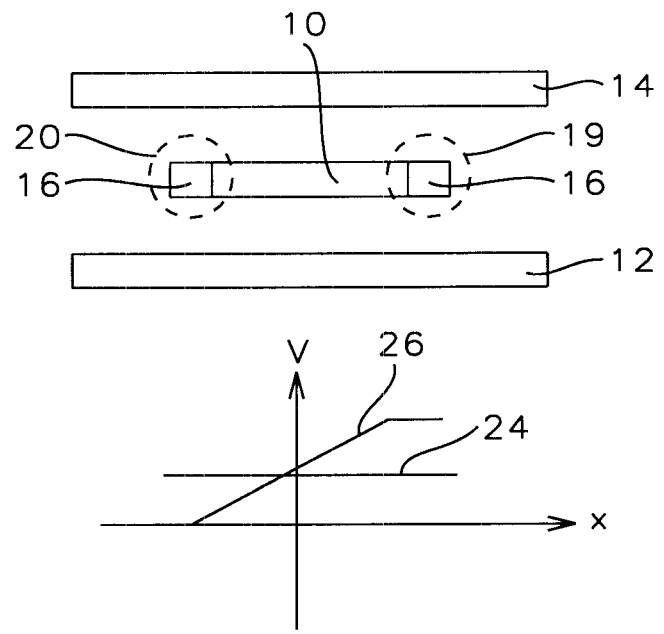
FIG. 1 is a schematic drawing of a MR/GMR sensor element surrounded by two magnetic shields, showing the regions in which electrical discharge is most likely to occur. The schematic drawing is positioned above a graph showing the longitudinal dependance of the electrical potential of the sensor and the shields.

Referring to FIG. 1, there is shown a schematic diagram of an MR/GMR sensor element (10) positioned between two magnetic shields, (12) and (14). Current carrying leads, (16) and (18), are affixed to each end of the sensor element (10) in what are known as abutted junctions. The two dashed circles, (19) and (20), indicate regions where electrical discharges are, most likely to occur between the sensor element and the shields.

Beneath the sensor and shields is a qualitative graph of electrical potential versus horizontal position along the sensor and shields. Potential V is plotted in the "y" direction, while the horizontal position is designated as the "x" direction. The graph displays two potential curves. The horizontal line (24) is the constant potential of the magnetic shields, here shown as being positive. The ramped line (26) represents the potential of the sensor element, which increases linearly according to the Ohm's law equation V=IR, where V is the potential (here assumed measured relative to a zero potential of the leftmost lead), I is the bias-current and R is the resistance of the sensor. The two regions encircled by dashed lines, (19) and (20), are regions of greatest potential difference between the sensor and the shields and, therefore, are the regions where electrical discharge is most likely to occur.

Figure 2A:
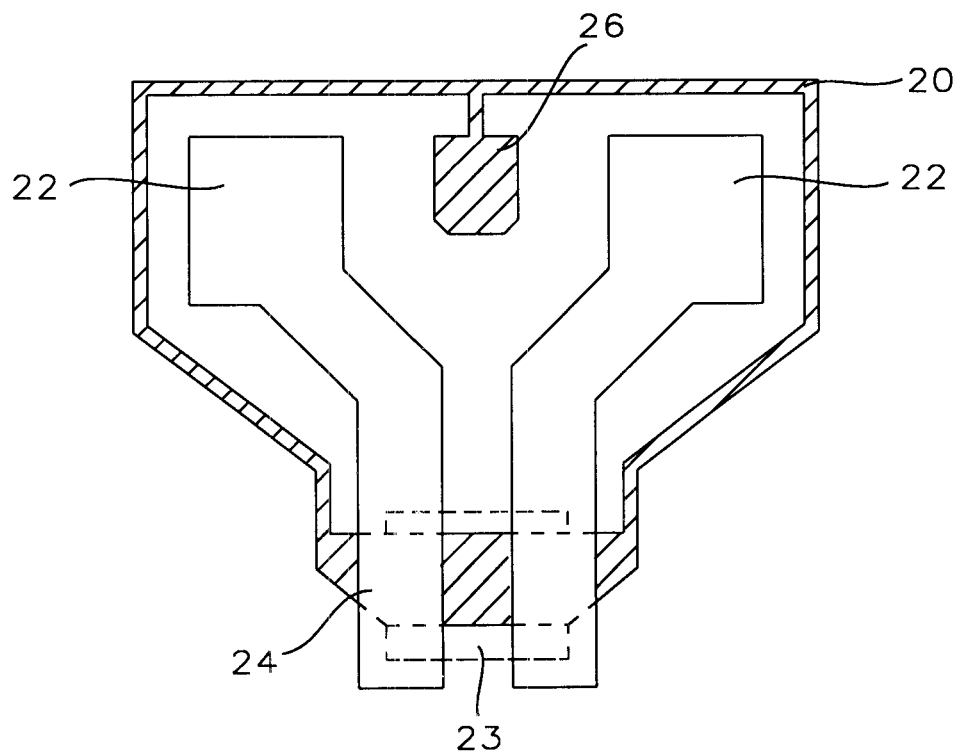
FIG. 2a is a schematic drawing of the top surface of the MR/GMR sensor assembly showing the conducting leads of the sensor, the routing pattern of the electrical half-bridge locations of the connection points to the magnetic shields.
Figure 2B:
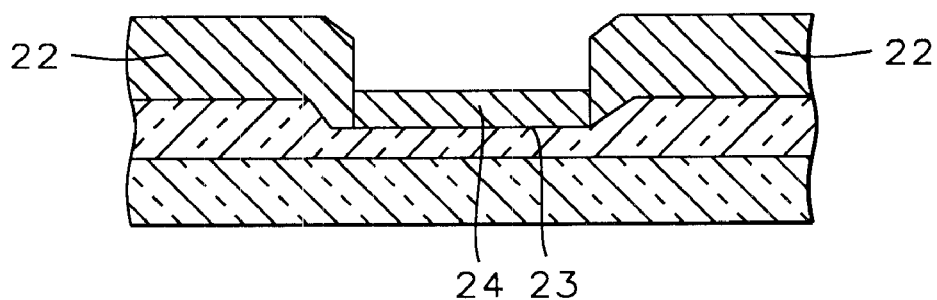
FIG. 2b is a schematic front view of an abutted conductor lead junction.
Figure 2C:
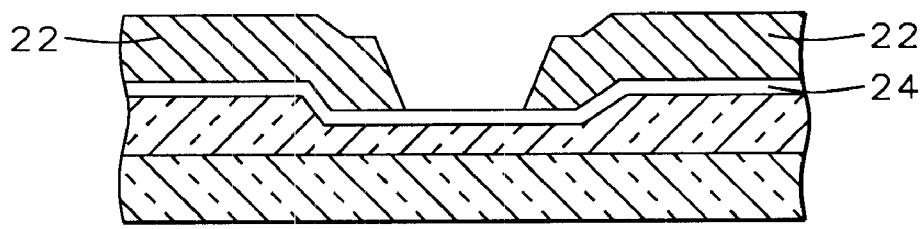
FIG. 2c is a schematic front view of a continuous conductor lead junction.

Referring to FIG. 2a, there is shown, schematically, an overhead view of an MR/GMR read head fabrication on which has been patterned and formed a half-bridge (20) in a simplified, conceptual routing scheme. The half bridge is formed as an integral part of the MR/GMR sensor element (24) and co-planar with it, but extends out beyond it and is routed away from said sensor element to the rear of the fabrication where the dielectric film between shield and sensor is thicker. The two conducting leads (22) are joined to the sensor element within a window region (23), either by the formation of an abutting junction or a continuous junction. A more detailed view of these two types of junctions is shown in FIG. 2b and FIG. 2c. The rearmost portion of the bridge has a pad (26) at its midpoint for forming interconnects to the magnetic shields. Although the geometry of the half-bridge is simplified in this conceptual pattern, the actual half-bridge would follow a convoluted path in order to acquire the necessary length and resistance and would be routed so as to accommodate constraints such as lead positions. A length of between 200 and 400 microns and a width of between 1 and 2 microns would be consistent with the objects of the present invention.

Referring now to FIG. 2b, there is shown a front schematic view of a portion of the fabrication of FIG. 2a, showing an abutted junction formed between the conducting leads (22) and the MR/GMR sensor element layer (24). The formation of an abutted junction requires the removal, by etching, of a portion of the MR/GMR sensor layer and its replacement by the conductor leads. The window region is also seen (23).

Referring now to FIG. 2c, there is shown a front schematic view of a portion of the fabrication of FIG. 2a, showing a continuous junction formed between the conducting leads (22) and the MR/GMR sensor element layer (24). The conducting leads are now formed over the sensor layer and it is not required that a portion of said sensor layer be removed.

Figure 3:
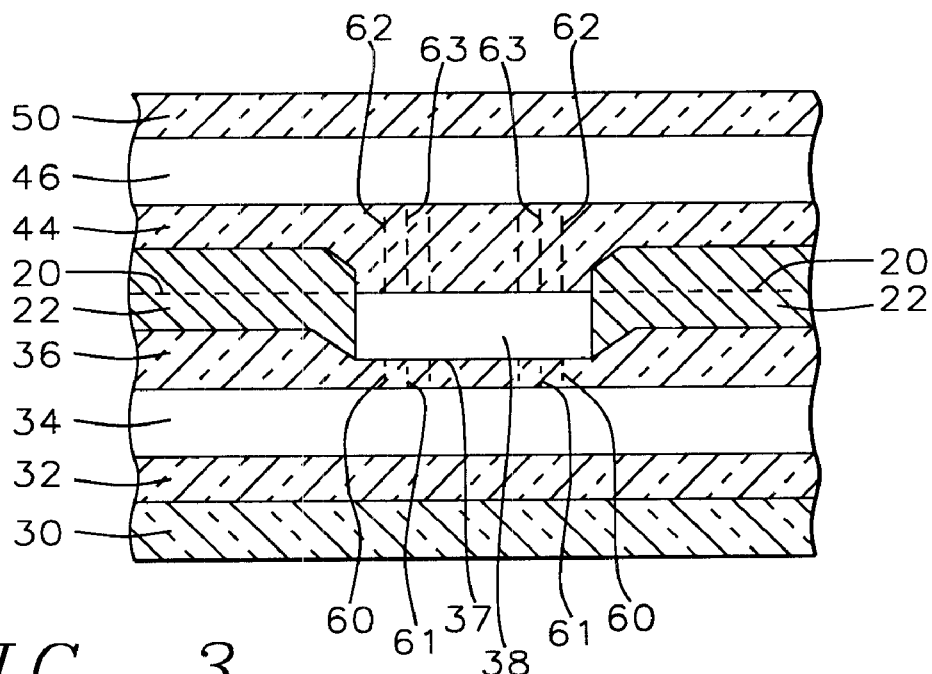
FIG. 3 is a schematic cross-sectional view of an MR/GMR read head and half-bridge, formed in accordance with the objects and methods of the present invention.

Referring now to the diagram in FIG. 3, there is seen a schematic front cross-sectional view of an MR/GMR read head and half-bridge, fabricated in accordance with the objects and methods of the present invention. Beginning with a substrate (30), which would typically be composed of a TiC/Alumina ceramic of approximately 1 mm thickness. A first dielectric layer (32), which would typically be a layer of aluminum oxide, of thickness between 1 micron and 5 microns is formed over said substrate. A first magnetic shield (34), typically consisting of one or more layers of NiFe of total thickness between 1 micron and 5 microns is formed over said first dielectric layer. Said shield layers may have differing ratios of Ni and Fe content and may be insulated by aluminum oxide or other non-ferromagnetic materials. A second dielectric layer (36) which is typically a layer of aluminum oxide of thickness between 200 angstroms and 1,000 angstroms is formed over said first magnetic shield. A number of via holes (60), which are indicated by dashed lines because they are behind the plane of this figure, can be patterned and etched through said second dielectric layer to allow passage of interconnects between the pad (shown as (26) in FIG. 2a and not visible in this figure) on the half-bridge and the first magnetic shield. In addition to the via holes, a window (37) (a region within which the dielectric layer is thinner) is also patterned in said second dielectric layer (36), whose purpose is to reduce the shield-to-shield spacing. Over said second dielectric layer there is now formed an MR/GMR sensor element layer (38) of a type well known to practitioners of the current art. The half bridge (whose upper surface (20) is shown in this figure by dashed lines to indicate that it passes behind the figure plane) is formed simultaneously with and integral with said MR/GMR layer and is connected in parallel with said MR/GMR layer; it is composed of the same material as said MR/GMR layer and it is co-planar with it. Said MR/GMR layer and half-bridge structure are formed to a thickness of between 200 angstroms and 500 angstroms. Said half-bridge is patterned in a convoluted shape so as to attain a length of between 200 microns and 400 microns, a width of between 1 micron and 2 microns and a resistance substantially greater than that of said MR/GMR sensor element. As already noted, the half-bridge also contains a pad ((26) in FIG. 2a) to facilitate connections to the first and second magnetic shields.

As shown in this diagram, the lead/sensor junction is an abutted junction. In accordance with the art of forming such a junction, a set of conducting leads (22) is now patterned and deposited on either side of said sensor element, replacing, thereby, a portion of the MR/GMR layer. Said lead formation may also include appropriate layers of magnetic material to provide longitudinal bias for the sensor element. The positioning of the leads defines the width of the read gap. If the lead/sensor junction is a continuous junction, the leads will be formed on the MR/GMR layer. In either case, the leads are formed over the half-bridge structure. A third dielectric layer (44), similar to the second dielectric layer (36), is formed over said leads, sensor element and half bridge structure. A number of via holes (62) (shown dashed because they are behind the plane of the drawing) is patterned and etched through said third dielectric layer, to permit the formation of conducting interconnects between the pad ((26 in FIG. 2a) on the half-bridge and a second magnetic shield (46) is then formed over said third dielectric layer, said shield being similar to the first magnetic shield (34) in total thickness and material composition, but can differ from said first shield in its layer structure. A final insulating layer (50) is formed over said second magnetic shield to separate the read-head from the write head portion of the head assembly located above it.

As is seen from the above description, the parallel connection between said half-bridge and said MR/GMR sensor element is achieved by the fabrication of said conducting leads directly on said MR/GMR element and half-bridge. By fabricating said lead connections at locations substantially above the air-bearing surface (ABS) of the sensor element and outside the dielectric window (37), electrical connection to said half bridge is maintained even when said sensor is inadvertently ground away by overlapping, thus facilitating failure analysis.

Finally, said half-bridge is simply and advantageously connected to the first and second magnetic shields by conducting interconnects (shown schematically as single dashed lines (61&63)) passing through the vias (60&62) etched through the second (36), and third (44) dielectric layers above and below pad (26) of FIG. 2a. An advantage of this connection is that it does not require the half-bridge to extend beyond the upper shield (46) to connect to external circuitry.

As is understood by a person skilled in the art, the preferred embodiment of the present invention is illustrative of the present invention rather than limiting of the present invention. Revisions and modifications may be made to methods, materials, structures and dimensions employed in fabricating an MR/GMR read head with balanced shield connections as well as to the materials and structures comprising said MR/GMR read head with balanced shield connections fabricated in accord with the preferred embodiment of the present invention, while still providing a method for fabricating such an MR/GMR read head with balanced shield connections and the MR/GMR read head with balanced shield connections so fabricated, in accord with the spirit and scope of the present invention as defined by the appended claims.

What is claimed is:

1. A method for fabricating an MR/GMR read head with balanced shield connections comprising:

providing a substrate;

forming over said substrate a first dielectric layer;

forming over said first dielectric layer a first magnetic shield;

forming over said first magnetic shield a second dielectric layer;

patterning and etching a set of vias in said second dielectric layer in a first location;

patterning a window in said second dielectric layer;

forming over said second dielectric layer an MR/GMR sensor element layer, said layer being formed as a sensor element portion and a half-bridge portion, said half-bridge portion being connected in parallel with, being integral with and being coplanar with said sensor element portion;

routing said half bridge in an appropriate manner;

joining two conducting lead layers to said MR/GMR sensor element and said half bridge;

forming a third dielectric layer over both said conducting lead layers, said MR/GMR sensor element and said half-bridge;

patterning and etching a set of vias in said third dielectric layer in a second location;

forming over said third dielectric layer a second magnetic shield;

connecting said half-bridge to said first magnetic shield with conducting interconnects passing through said vias in said first location in said second dielectric layer and to said second magnetic shield with conducting interconnects passing through said vias in said second location in said third dielectric layer.

2. The method of claim 1 wherein said substrate is a substrate composed of TiC/Alumina ceramic, formed to a thickness of approximately 1 mm.

3. The method of claim 1 wherein said first dielectric layer is a layer of aluminum oxide, formed to a thickness of between 1 micron and 5 microns.

4. The method of claim 1 wherein said first magnetic shield is a shield comprising one or more layers of NiFe, formed to a total thickness of between 1 micron and 5 microns.

5. The method of claim 4 wherein the NiFe layers may have different ratios of Ni to Fe and may be separated by insulating layers of aluminum oxide or other non-ferromagnetic material.

6. The method of claim 1 wherein the second dielectric layer is a layer of aluminum oxide of thickness between 200 angstroms and 1,000 angstroms.

7. The method of claim 1 wherein said half-bridge is formed in a convoluted path to attain a length of between 200 microns and 400 microns and to have a width between 1 micron and 2 microns.

8. The method of claim 1 wherein said half-bridge is formed so as to have a resistance which is approximately 100 times the resistance of said MR/GMR sensor element.

9. The method of claim 1 wherein said half-bridge has an integrally formed pad at its mid-span for connecting said half-bridge to said first and second magnetic shields with said conducting interconnects.

10. The method of claim 1 wherein said conducting leads are joined to said MR/GMR sensor layer in an abutting junction, said junction being formed by removing a portion of said MR/GMR sensor layer and depositing said leads into the region formed by the removal of said portion.

11. The method of claim 1 wherein said third dielectric layer is a layer of aluminum oxide, formed to a thickness of between 200 angstroms and 1,000 angstroms.

12. The method of claim 1 wherein said second magnetic shield is a shield comprising one or more layers of NiFe, formed to a total thickness of between 1 micron and 5 microns.

13. The method of claim 2 wherein the NiFe layers may have different ratios of Ni to Fe and may be separated by insulating layers of aluminum oxide or other non-ferromagnetic material.

* * * * *